UNITED STATES PATENT OFFICE.

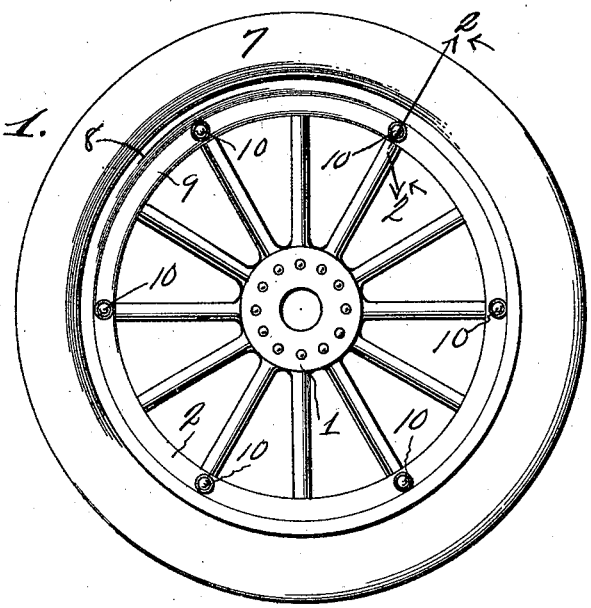

EDMUND H. SIMONTON, OF GARY, SOUTH DAKOTA.

PNEUMATIC-TIRE COVERING.

1,414,050.

Specification of Letters Patent. Patented Apr. 25, 1922.

Application filed February 11, 1921. Serial No. 444,166.

*To all whom it may concern:*

Be it known that I, EDMUND H. SIMONTON, a citizen of the United States, residing at Gary, in the county of Deuel, State of South Dakota, have invented a new and useful Pneumatic-Tire Covering; and I do hereby declare the following to be a full, clear, and exact description of the invention, such as will enable others skilled in the art to which it appertains to make and use the same.

The invention relates to coverings for pneumatic tires and has for its object to provide means whereby an outer casing may be disposed on the outer casing of a conventional form of pneumatic tire thereby protecting the casing of the pneumatic tire and prolonging the life thereof. The covering casing may be a new casing, or a worn casing which has been on the pneumatic tire proper.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of automobile wheel, showing the tire covering applied thereto.

Figure 2 is a sectional view taken on line 2—2 of Figure 1.

Figure 3 is a side elevation of a modified form of retaining flange showing the same formed in section.

Figure 4 is a detail sectional view taken on line 4—4 of Figure 3.

Referring to the drawings, the numeral 1 designates a conventional form of automobile wheel and 2 the felly thereof. The felly 2 is provided with a demountable rim 3, on which demountable rim a pneumatic tire 4 is disposed. The pneumatic tire 4 comprises the outer casing 5 and the inner tube 6. It has been found that when the casing 5 becomes worn that blowouts develop and that it is necessary to secure a new casing. To obviate this difficulty and to continue using the old casing, an old tire casing 7, or a new tire casing is disposed on the casing 5 and is held thereon by means of the flanges 8 of rings 9, which rings are secured to the felly 2 of the wheel by means of bolts 10. If a new tire casing 7 is used, as soon as the same becomes worn, it may be placed in the position of the tire casing 5 and a new casing placed on the outside. When this is done the new casing will prevent blowouts in the weakened casing 5, thereby prolonging the life of the tire. Rings 9 have their flanges 11 outwardly disposed so that the peripheries of said flanges will form a seat for the inner edges of the casing 7 so that the clincher flanges 8 will engage over the beads 12 of the casing 7 and securely hold said casing in place on the casing 5.

Casing 7 is placed on the casing 5 when the tire 4 is deflated and after the parts have been assembled with the tire in a deflated condition, the inner tube 6 is inflated thereby forcing the outer periphery of the casing 5 into engagement with the inner periphery of the casing 7.

The ring 9 shown in Figure 3 is formed in segmental sections $9^a$, which sections have their flanges $9^b$ provided with offset apertured lugs $9^c$ which overlie the ends of the adjacent flange $9^b$, and through which apertures the bolts 10 may pass for securely holding the rings in place on the felly.

From the above it will be seen that an automobile tire covering is provided, wherein the use of a conventional form of tire casing is possible, thereby allowing old or new tire casings to be utilized for tire coverings in such a manner to prolong the life of the casing and also allowing an autoist to obtain the maximum life service from each casing.

The invention having been set forth what is claimed as new and useful is:—

The combination with a pneumatic tire carried by an automobile wheel, of a tire covering for said pneumatic tire, said tire covering being formed from a tire casing disposed on the periphery of the pneumatic tire and provided with clincher flanges, detachable clincher rings carried by the felly of the wheel, said clincher rings having outwardly extending flared annular flanges forming engaging bases for the clincher flanges of the tire casing, the outer edges of the flared annular flanges terminating in clincher members adapted to engage the clincher flanges of the tire casing and hold said casing in position on the pneumatic tire, said clincher rings being formed in sections, the ring sections being provided with flanges engaging the wheel felly, the ring sections having one of their ends provided with an offset portion provided with an aperture and forming recesses for the reception of the non-offset portion of the adjacent ends of the other sections of the rings, said non-offset portions being provided with apertures adapted to register with the apertures in the offset portions of the ends of the ring sections.

In testimony whereof I have signed my name to this specification in the presence of two subscribing witnesses.

EDMUND H. SIMONTON.

Witnesses:
E. L. LOHR,
L. A. LAKE.